(12) United States Patent
Haydell

(10) Patent No.: US 10,974,264 B2
(45) Date of Patent: Apr. 13, 2021

(54) CONDITIONING APPARATUS FOR PROVIDING A CARRIER GAS

(71) Applicant: Michael Haydell, Lafayette, LA (US)

(72) Inventor: Michael Haydell, Lafayette, LA (US)

( * ) Notice: Subject to any disclaimer, the term of this patent is extended or adjusted under 35 U.S.C. 154(b) by 0 days.

(21) Appl. No.: 16/332,277

(22) PCT Filed: Sep. 13, 2017

(86) PCT No.: PCT/GB2017/052703
§ 371 (c)(1),
(2) Date: Mar. 11, 2019

(87) PCT Pub. No.: WO2018/051089
PCT Pub. Date: Mar. 22, 2018

(65) Prior Publication Data
US 2019/0201922 A1    Jul. 4, 2019

(30) Foreign Application Priority Data

Sep. 13, 2016   (GB) ...................................... 1615549

(51) Int. Cl.
*B05B 7/24*       (2006.01)
*B01D 53/26*     (2006.01)
*B01D 53/79*     (2006.01)

(52) U.S. Cl.
CPC ............ *B05B 7/2491* (2013.01); *B01D 53/26* (2013.01); *B05B 7/2416* (2013.01); *B01D 53/79* (2013.01); *B01D 2259/124* (2013.01)

(58) Field of Classification Search
None
See application file for complete search history.

(56) References Cited

U.S. PATENT DOCUMENTS

| | | | |
|---|---|---|---|
| 4,761,299 A | 8/1988 | Hufstetler | |
| 5,725,154 A | 3/1998 | Jackson | |
| 6,349,668 B1 | 2/2002 | Sun et al. | |
| 2009/0107111 A1* | 4/2009 | Oliver | B01D 53/62 60/274 |
| 2015/0352567 A1 | 12/2015 | Mayer | |

FOREIGN PATENT DOCUMENTS

| | | |
|---|---|---|
| CN | 104438007 | 3/2015 |
| CN | 104492640 | 4/2015 |
| EP | 1332784 | 8/2003 |

OTHER PUBLICATIONS

Search Report and Written Opinion dated Jan. 2, 2018 in International Application Serial No. PCT/GB2017/052703.

\* cited by examiner

*Primary Examiner* — Jethro M. Pence
(74) *Attorney, Agent, or Firm* — Haugen Law Firm PLLP

(57) ABSTRACT

A conditioning apparatus (2) for providing a carrier gas (6), the apparatus including: an inlet (4) for a pressurized inlet gas (6); a cleaning unit (10) to provide clean pressurized gas (6), the cleaning unit (10) including one or more filters to remove solid and/or liquid contamination particles from the pressurized gas (6) and a drying station to remove moisture from the pressurized gas (6); an ionization chamber (16) which ionizes the clean pressurized gas; and an outlet for clean, pressurized, ionized gas; wherein the gas ionized in the ionization chamber (16) has a chemical composition which is substantially the same chemical composition as the inlet gas.

9 Claims, 1 Drawing Sheet

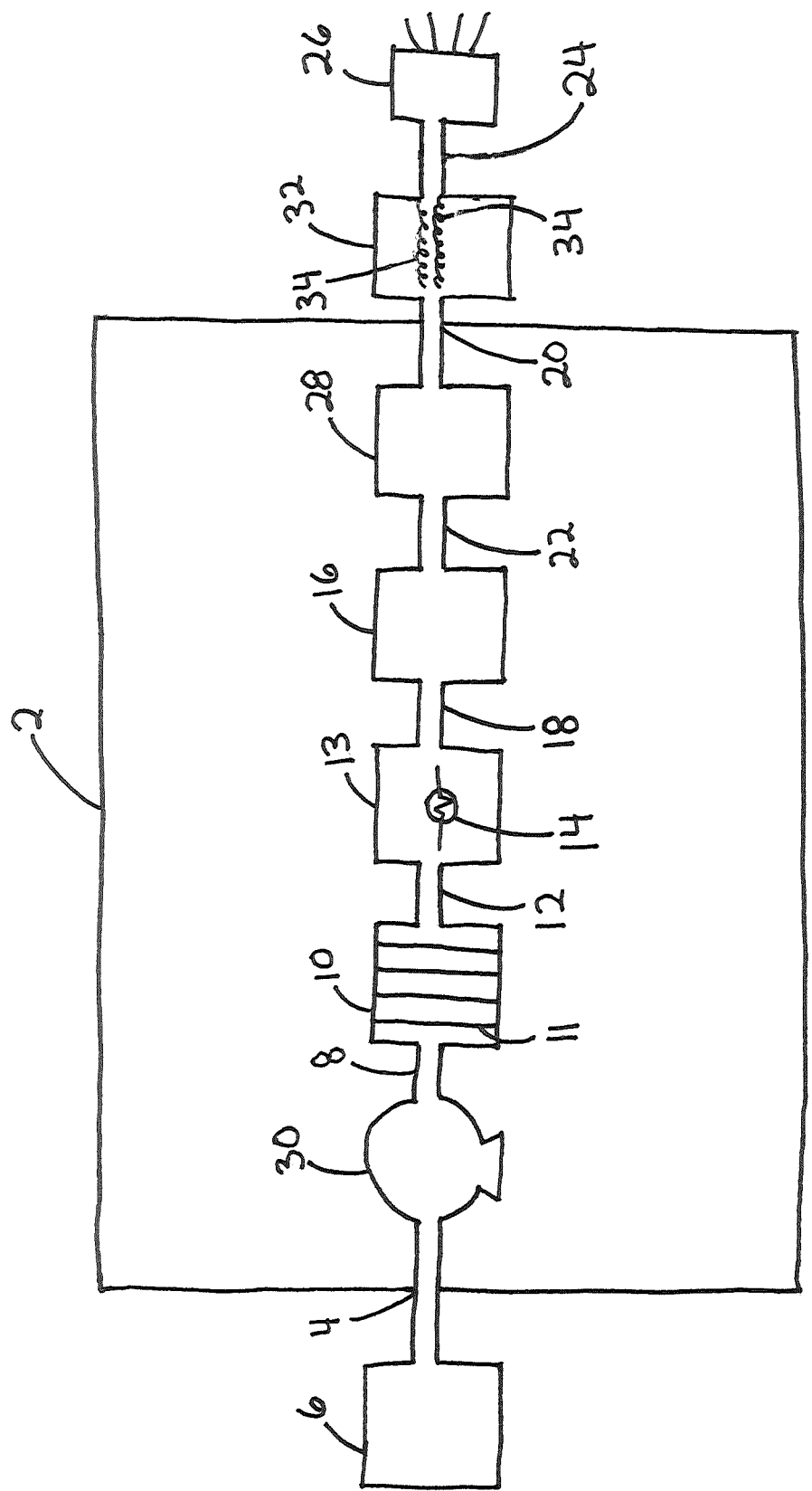

CONDITIONING APPARATUS FOR PROVIDING A CARRIER GAS

The present invention relates to a conditioning apparatus for providing a carrier gas, and in particular for providing a carrier gas for use in the application of a liquid or solid spray medium to a surface via a spray apparatus.

It is known to provide carrier gases for use in spray processes. In such systems, a carrier gas is prepared and then has entrained therein a dispersed solid or liquid spray medium, which is subsequently applied to a surface.

Such known carrier gases typically start with atmospheric air, which is then treated to form a carrier gas. An example of such a process and apparatus to prepare a carrier gas is disclosed in EP1332784. This document discloses a treatment process which removes all oxygen from a pressurised air supply to provide a carrier gas.

It is also known to ionize a carrier gas for use in certain spray processes. However, the carrier gas is typically treated to modify the gas composition prior to ionization. The applicants have found that it is possible to ionize a carrier gas without modification of the gas composition without adversely affecting the ability of the carrier gas to be used in spray processes.

Accordingly, a first aspect of the invention provides an conditioning apparatus for providing a carrier gas, the conditioning apparatus including: an inlet for a pressurized inlet gas; a cleaning unit to provide clean pressurized gas, the cleaning unit including one or more filters to remove solid and/or liquid contamination particles from the pressurized gas and a drying station to remove moisture from the pressurized gas; an ionization chamber which ionizes the clean pressurized gas; and an outlet for clean, pressurized, ionized gas; wherein the gas ionized in the ionization chamber has a chemical composition which is substantially the same chemical composition as the inlet gas. The carrier gas is suitably a carrier gas for use in spraying applications, i.e. the carrier gas is suitably a spray carrier gas.

In the context of the present invention, the term "composition of the gas", such as "composition of the gas ionized in the ionization chamber" or "composition of the inlet gas" refers to the chemical composition of the gas, ignoring entrained components such as particulate matter and water vapour. In other words, the gas that is ionized has the same chemical composition as the inlet gas. It will be appreciated that the chemical composition of gas refers to the ratio by volume of the components of the gas. For example, the composition of dry air is considered to be about 78% nitrogen, 21% oxygen and 1% which is a mixture of argon and carbon dioxide.

In the context of the present invention, substantially the same composition of gas includes difference in the percentages by volume of the individual components of 5%, 4%, 3%, 2% or 1%. For example, where the gas is air, the chemical composition of the ionized gas may be 76%-80% by volume of nitrogen; 19%-23% by volume of oxygen and up to 3% by volume of argon/carbon dioxide. In particular, the chemical composition of the ionized gas may be 77%-79% by volume of nitrogen, 20%-22% by volume of oxygen and up to 2% by volume of argon/carbon dioxide.

The inlet gas may be a single gas or it may be a mixture of different gases. For example, the inlet gas may be air.

It will be appreciated that in embodiments in which the clean pressurized gas is air, the ionization chamber ionizes a gas which contains about 19%-23%, such as 20%-22%, by volume of oxygen.

In an embodiment of the invention, the drying station removes the moisture/water vapour via a refrigeration circuit which cools the pressurized inlet gas down to a temperature below its dew point; a deliquescent dryer which removes the water vapour by passing the pressurised inlet gas through a hygroscopic medium; a desiccant dryer which removes the water via an adsorption process; a membrane dryer; or combinations thereof. The drying station typically includes a refrigeration circuit configured to cool the pressurized inlet gas to a temperature below its dew point.

The conditioning apparatus may receive a source of pressurized inlet gas at the desired pressure. However, it may include a compressor which compresses the inlet gas upstream of the cleaning unit.

The conditioning apparatus may further include a treatment station located downstream of the ionization chamber and upstream of the outlet, wherein the treatment station removes unwanted products from the ionized carrier gas (e.g. ionized air). Any unwanted products generated by the ionization step may be removed from the carrier gas for example by filters, such as activated carbon filters.

According to a second aspect of the invention, there is provided a spray system including a conditioning apparatus for providing a carrier gas as defined anywhere herein; and a spray apparatus connected to the outlet of the conditioning apparatus via a hose.

The hose which connects the spray gun to the apparatus may include a temperature control system. In other words, it may include one or more heating elements which are configured to increase the temperature of the carrier gas within the hose and/or it may include a cooling system configured to reduce the temperature of the carrier gas within the hose.

The spray apparatus suitably includes a reservoir for the liquid or solid spray medium (i.e. a coating medium to be applied to a surface) to be sprayed, which becomes entrained within the carrier gas in use.

In certain embodiments, the spray apparatus is configured to modify the physical properties of the carrier gas, such as shaping and/or driving the carrier gas flow and atomizing the spray medium.

According to a third aspect of the invention, there is provided a method of preparing a carrier gas, the method including: directing a flow of an inlet gas to the inlet of a conditioning apparatus as defined in the first aspect of the invention; cleaning the flow of the gas by removing solid and/or liquid contaminants and moisture from the gas flow to provide a clean pressurized flow of gas; and ionizing the clean pressurized flow of gas, wherein the ionization step ionizes a gas flow having a gas composition which is substantially the same as the inlet gas.

The inlet gas is suitably pressurized upstream of the cleaning unit (i.e. prior to the cleaning step).

In an embodiment of the third aspect of the invention, the cleaning step includes cooling the pressurized gas to a temperature below its dew point.

The method may further include the step of removing undesired products from the ionized air after the ionization step.

The skilled person will appreciate that the features described and defined in connection with the aspect of the invention and the embodiments thereof may be combined in any combination, regardless of whether the specific combination is expressly mentioned herein. Thus, all such combinations are considered to be made available to the skilled person.

An embodiment of the invention will now be described, by way of example only, with reference to the accompanying drawing in which:

FIG. 1 is a schematic representation of an apparatus for providing a carrier gas according to the first aspect of the invention.

For the avoidance of doubt, the skilled person will appreciate that in this specification, the terms "upstream", "downstream", etc. refer to the order of the steps in the example as described hereinafter and as shown in the FIGURE.

A conditioning apparatus 2 for preparing a carrier gas includes an inlet 4 in fluid communication with a source of a pressurized inlet gas 6. The flow of pressurized inlet gas is directed via a conduit 8 to a filtration station 10 including a number of filters 11 which remove liquid and solid particulate contaminants from the gas flow. Filters for use in removing such contaminants from a flow of pressurized gas are well known.

After filtration, the flow of pressurized gas is carried via a second conduit 12 to a gas drying station 13 comprising a refrigeration system 14 which cools the flow of pressurized gas to a temperature below its dew point to remove water vapour from the flow of gas. The refrigeration system 14 subsequently heats the flow of pressurized gas to a predetermined temperature before it is carried to an ionization chamber 16 via a third conduit 18. The skilled person will understand that a number of different methods are known for drying a flow of pressurized gas and while a refrigeration system is described herein, the pressurized air may be dried in other ways.

The flow of pressurized gas is ionized in the ionization chamber 16.

The flow of ionized, pressurized gas exits the ionization chamber 16 and is directed to an outlet port 20 via a fourth conduit 22.

A hose 24 is fluidly connected to the outlet port 20 such that the ionized, pressurized carrier gas is directed to a spray apparatus 26, such as a conventional spray gun or a spray robot. The hose 24 includes a heating element 34 such that the temperature of the pressurized gas within the hose 24 can be varied as desired.

The skilled person will appreciate that where the inlet gas includes oxygen, any undesired products generated by the ionization process may be removed by a treatment station 28 located between the ionization chamber 16 and the outlet port 20.

A compressor 30 may be located upstream from the cleaning unit, which includes filtration station 10 and drying station 13.

The hose 24 may include a temperature control system 32 to control the temperature of the carrier gas within the hose 24. The temperature control system may include one or more heating elements 34.

The invention claimed is:

1. A conditioning apparatus for providing a carrier gas, the apparatus including:
a gas inlet for a flow of inlet gas;
a cleaning unit to provide a clean flow of gas, the cleaning unit including one or more filters to remove solid and/or liquid contamination particles from the gas flow and a drying station to remove moisture from the gas flow;
an ionization chamber which ionizes the clean gas flow to generate the carrier gas;
an outlet port for the clean, ionized carrier gas; and
a treatment station located downstream of the ionization chamber, wherein the treatment station includes an activated carbon filter to remove undesired products from the ionized gas;
wherein the gas ionized in the ionization chamber has a chemical composition which is substantially the same as the chemical composition of the inlet gas.

2. The conditioning apparatus according to claim 1, wherein the drying station includes a heat exchanger configured to cool the gas flow to a temperature below its dew point.

3. The conditioning apparatus according to claim 1, wherein the apparatus further includes a compressor located upstream of the cleaning unit.

4. A spray apparatus including the & conditioning apparatus according to claim 1, and the spray apparatus connected to the outlet of the conditioning apparatus via a hose.

5. The A spray apparatus according to claim 4, wherein the hose includes a temperature control system configured to control a temperature of the carrier gas within the hose.

6. The spray apparatus according to claim 5, wherein the temperature control system includes one or more heating elements.

7. A method of preparing a carrier gas, the method including:
directing a flow of pressurized inlet gas to an apparatus according to claim 1;
cleaning the flow of pressurized gas by removing solid and/or liquid contaminants, and moisture from the gas flow to provide a clean flow of pressurized gas; and
ionizing the clean flow of pressurized gas, wherein the ionization step ionizes an gas flow having a gas composition which is substantially the same as the composition of the inlet gas.

8. The Method according to claim 7, wherein the cleaning step includes drying the gas flow by cooling it to a temperature below its dew point.

9. The Method according to claim 7, further including the step of removing any undesired products generated by the ionization step from the carrier gas.

* * * * *

UNITED STATES PATENT AND TRADEMARK OFFICE
CERTIFICATE OF CORRECTION

PATENT NO. : 10,974,264 B2  
APPLICATION NO. : 16/332277  
DATED : April 13, 2021  
INVENTOR(S) : Michael Haydell Page 1 of 1

It is certified that error appears in the above-identified patent and that said Letters Patent is hereby corrected as shown below:

In the Claims

Column 4, Line 27, "4. A spray apparatus including the & conditioning" should read -- 4. A spray apparatus including the conditioning --.

Column 4, Line 30, "5. The A spray apparatus according to claim 4, wherein" should read -- 5. The spray apparatus according to claim 4, wherein --.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*